United States Patent [19]

Mantha

[11] 4,175,121
[45] Nov. 20, 1979

[54] METHIONINE HYDROXY ANALOG-CONTAINING FEED FOR LACTATING COWS

[75] Inventor: Nagaraja S. Mantha, Greenfield Park, Canada

[73] Assignee: Agrimel Ltd., Laprairie, Canada

[21] Appl. No.: 888,191

[22] Filed: Mar. 20, 1978

[51] Int. Cl.$^2$ .............................................. A23K 1/00
[52] U.S. Cl. ........................................ 424/94; 426/2; 426/807; 426/656; 424/319
[58] Field of Search .................. 426/2, 60, 52, 53, 54, 426/656, 807; 424/93, 94, 317, 319, 177, 180

[56] References Cited

U.S. PATENT DOCUMENTS

| | | | |
|---|---|---|---|
| 2,988,448 | 6/1961 | Hollenbeck | 424/94 |
| 3,250,262 | 5/1966 | Brooks | 424/94 |
| 3,968,253 | 7/1976 | Bertram | 426/2 |
| 4,000,318 | 12/1976 | Ferguson et al. | 426/2 |

OTHER PUBLICATIONS

Wada, "Production of L-Amino Acids from 2 Hydroxy Acids", Chemical Abstracts, vol. 82, (1975), 15176d.
Akhmedov, "Enzymic Preparations in Calf Rations", Chemical Abstracts, vol. 72, (1970), 99363s.
Griel et al, "Milk Production Response to Feeding Methionine Hydroxy Analog to Lactating Dairy Cows", J. Dairy Science, vol. 51, No. 11, (1968), pp. 1866–1868.

*Primary Examiner*—R. B. Penland

[57] ABSTRACT

A premix or concentrate is described containing essential nutrients, methionine hydroxy analog, minerals, vitamins, proteins, *Aspergillus oryzae* and a buffer. It provides improved milk production when fed to lactating cows on a regular basis.

9 Claims, No Drawings

METHIONINE HYDROXY ANALOG-CONTAINING FEED FOR LACTATING COWS

BACKGROUND OF THE INVENTION

1. Field of the Invention

This invention relates to improvements in animal feeds. More particularly, the invention relates to improvements in the utilization of feed by dairy cows.

2. Description of the Prior Art

It is well known that the amino acids in orally fed proteins are largely degraded to ammonia by rumen microorganisms. The ammonia so evolved is then reconstituted into the specific amino acids needed to synthesize and multiply protein, mostly in the form of bacteria. Thus, the proportion of the various amino acids in feed proteins and that in the ruminally synthesized protein is often distinctly different. In some cases the biological value of the synthesized protein is superior to that of the feed protein; on the other hand, the reverse is often true. In effect, the type of synthesis that occurs in the ordinary rumen function tends to convert all feed proteins to a common mould. Although the supply of methionine in this common mould may be adequate for the gestating or fattening animal, it is deficient for the maximum performance of fast-growing young animals, high-wool producing sheep or high-milk producing dairy cows.

In the case of the dairy cow, methionine plays an important role in lipid metabolism in addition to its contribution to milk protein formation. At the time of freshening, the high-producing cow cannot supply from feed alone all the nutrients needed for maximum milk production, and must draw heavily on body stores, especially body fat deposits. Methionine is the major chain initiator in lipo-protein synthesis, the mechanism by which body fats are mobilized and transported to the mammary gland. Thus, at the peak of production the cow has multiple needs for a single nutrient that is produced by the rumen in limited quantities. Increasing the oral supply of methionine, subject to attack in the rumen, has no effect on the amount available to the cow itself. However, the use of methionine analog instead of the preformed amino acid has been found to result in greater methionine availability as indicated by elevated methionine blood levels in analog-fed cows.

There are many published articles in technical journals on the effects of methionine hydroxy analog such as the article of L. C. Griel, Jr. et al. "Milk Production Response to Feeding Methionine Hydroxy Analog to Lactating Dairy Cows", *Journal of Dairy Science, Vol.* 51, No. 11, pages 1866–1868. However, in terms of weekly production of 4% fat-corrected milk, only about a 5% increase in milk production was obtained with a feeding of 40 g analog per day and an increase of about 9% with a feeding of 80 g analog per day. In other words, the yield increases were fairly limited when compared with the increased feeding costs associated with these quantities of the methionine hydroxy analog.

Other studies such as Bishop, "Methionine Hydroxy Analogue Supplementation in Beef and Dairy Cattle", *Feedstuffs*, Vol. 43, No. 5, p. 31, again show only limited yield improvements by the feeding of the methionine hydroxy analog with, for instance, a yield increase of less than 11% with the best candidates, i.e. first-calf heifers during early lactation. In older cows after several lactations the response to the analog generally decreased. The material known as "methionine hydroxy analog" is 2-hydroxy-4-(methylthio) butyric acid.

It is, therefore, the object of the present invention to provide an aminal feed containing methionine hydroxy analog which will provide improved milk yield as compared to the previously known methionine hydroxy analog feed additives.

SUMMARY OF THE INVENTION

In accordance with the present invention, it has been discovered that by combining proper adjuncts with the methionine hydroxy analog as a dry premix, the effectiveness of the analog when fed to dairy cows is greatly increased.

Thus, according to one feature of the present invention, there is provided a complex or composition for adding to dairy feeds comprising methionine hydroxy analog and a fermentation enzyme extract preferably together with a buffer. The fermentation enzyme extract is a fungal enzyme, preferably derived from a microorganism of the genus *Aspergillus*, more particularly *Aspergillus oryzae*.

The composition can be a premix with essential nutrients in the form of a top dressing for a regular dairy feed or it may be part of the dairy feed. Typical of the essential nutrients are major and trace minerals, salt, vitamins and protein sources.

DESCRIPTION OF THE PREFERRED EMBODIMENTS

According to a preferred feature of the invention a premix or concentrate is prepared containing the following ingredients:

| Component | % By Weight |
| --- | --- |
| Dicalcium phosphate | 15–40 |
| Potassium and/or magnesium sulfate | 2–8 |
| Salt | 2–8 |
| Sodium bicarbonate (buffer) | 2–6 |
| Minerals | 0.4–0.8 |
| Vitamins | 0.01–0.1 |
| Methionine hydroxy analog | 5–20 |
| *Aspergillus oryzae* derived enzyme | 0.5–15 |
| Soybean Meal | 3–10 |
| Corn Gluten Meal | 25–45 |
| Linseed Meal | 2–8 |
| Molasses | 2–8 |

The above premix is fed to cows in quantities to provide about 20–40 g., preferably 20–30 g./day of methionine hydroxy analog to each animal. For instance, it may be fed as a top dressing on a dairy feed in an amount of about 8 oz. once per day. Alternatively, it can be mixed into a dairy feed in an amount of about 5% by weight. A typical dairy feed is one composed of a mixture of ground grains in the form of a mesh, e.g. a mixture of ground corn, oats, wheat, soybeans, etc. *Aspergillus oryzae* is a well known source of enzyme extract for inclusion in animal feeds and is generally known to act in a manner similar to natural enzymes produced by the animal body. Thus, it hydrolyzes complex hydrocarbates and proteins of plant material ingested by the animal feed and thereby makes it more easily digestable. Although it is not entirely understood why the presence of the fungal enzyme is so effective in increasing the utilization of the methionine hydroxy analog, it is belived that it helps in maintaining proper intraruminal and intra-abomasal enzyme concentrations so that maximum utilization of the analog can be achieved.

While the buffer has been specifically referred to above as sodium bicarbonate, other buffers are equally effective. For example, potassium or calcium bicarbonate may also be used, or any of the above bicarbonates may be mixed with magnesium oxide.

According to another feature of the present invention, it has been found that the present premix is more palatable to dairy cows than were previous methionine hydroxy analog compositions. This has been achieved by a special technique which has succeeded in camouflaging the taste of the analog. This was done by mixing the analog in particulate form with a dry powder flavouring material such as synthetic molasses flavouring. It appears that the fine powder of synthetic flavouring agent forms an adherent coating around the analog particles so that the animals are no longer able to detect the analog particles while eating the feed.

Many variations within the specific formulations are, of course, possible and, for instance, sodium tripolyphosphate may be used in amounts of 5–20% by weight. Moreover, as the enzyme there may be used a dried fermentation extract of the genus *Aspergillus* or this may be mixed with *Bacillus Subtilis*. Moreover, corn Gluten Meal may be eliminated altogether and larger quantities, e.g. 10–45% by weight of soy bean meal may be used. Another convenient flavoring agent that can be mentioned is artificial maple flavor.

The formulation of this invention can also be prepared in the form of a concentrate for addition to ordinary dairy feeds. The concentrate is normally used at a level of 10 kg. per tonne (1000 kg) of 16% dairy feed.

In order that the invention can be better understood, the following illustrative Examples are given. Those skilled in the art will appreciate that other compositions according to this invention can be prepared and applied in accordance with the Examples.

EXAMPLE 1

A premix was prepared containing the ingredients and having the analysis as set out in Table 1 below:

TABLE 1

| FORMULA INGREDIENT | % | GUARANTEED ANALYSIS | % |
|---|---|---|---|
| Dicalium Phosphate | 29.0 | Crude Protein | 25.0 |
| Feed Grade Potassium | | Crude Fat | 0.70 |
| % Magnesium Sulfate | 5.0 | Crude Fiber (Max.) | 1.50 |
| Salt | 5.0 | Calcium | 7.00 |
| Sodium Bicarbonate | 4.0 | Phosphorus | 7.00 |
| Zinc Oxide | 0.343 | Magnesium | 0.70 |
| Manganous Oxide | 0.135 | Potassium | 1.20 |
| Copper Sulfate | 0.10 | Salt | 5.00 |
| Cobalt Carbonate | 0.00625 | Iron | 0.27 |
| Ethylenediamine Dihydroiodide | 0.0075 | Zinc | 0.25 |
| | | Manganese | 0.081 |
| Vitamin A (500,000 Iu/gm) | 0.066 | Copper | 0.025 |
| | | Cobalt | 0.0025 |
| Vitamin D3 (400,00 Iu/gm) | 0.028 | Iodine | 0.006 |
| | | Fluorine (Max.) | 0.05 |
| Vitamin E (500 Iu/gm) | 0.077 | Vitamin A. I.u/lb | 150,000 |
| Methionine Hydroxy Analog of Calcium | 11.00 | Vitamin D. I.u./lb | 17,500 |
| | | Vitamin E I.u./lb | 175 |
| Aspergillus oryzae (Zymaferm) | 1.00 | | |
| Soybean Meal (44%) | 6.00 | | |
| Corn Gluten Meal (60%) | 35.00 | | |
| Linseed Meal (33%) | 5.00 | | |
| Liquid Molasses | 5.00 | | |
| Felcofix Molasse Flavor | 2.00 | | |
| Total | 108.76 | | |

A feeding experiment of the duration of 2 months was conducted on Holstein cows to demonstrate the effect of the premix on milk production and butterfat percentages. The animals were maintained on a normal feeding programme consisting of silage, hay and 16% dairy feed. This dairy feed consisted of a mix of 975 lbs. ground corn, 400 lbs. ground oats, 225 lbs. wheat bran and 300 lbs. soybean meal.

On the date of recording milk production and butterfat percentages of individual cows before feeding the premix, there were 55 cows in the herd, out of which 25.5% were in late lactation, 60% had passed peak lactation and 14.5% were in early lactation. On the date of recording one month after feeding the premix, out of 60 cows in the herd, 15% were in late lactation, 55% at passed peak lactation and 30% were in early lactation. On the date of recording two months after feeding the premix, out of 62 cows in the herd, 17.7% were in late lactation, 58% were at passed peak lactation and 24.3% were in early lactation.

After recording the initial levels, all of the cows in the herd were administered eight ounces per day of the premix of Table 1 as a top feed for a period of two months. The data on milk production and butterfat percentage of individual cows was recorded at the end of the first month and also at end of the second month after feeding the premix.

The results obtained are set out in Table 2 below.

TABLE 2

| Treatment | Avg. Daily Milk Prod.(lbs) | Avg.B.F. (%) |
|---|---|---|
| Control | 23.96 | 4.35 |
| 8 oz. Premix- One Month | 31.63 | 3.96 |
| 8 oz. Premix- Two Months | 31.79 | 3.61 |

Thus, it will be seen that compared to the control, the milk production increased by 32% at the end of the first month and by 32.7% at the end of the second month after administration of the premix. On an absolute basis, the average daily amount of butterfat produced before feeding the premix was 1.04 lb., while the average daily amount produced at the end of the first and second months after feeding premix were 1.25 lb. and 1.15 lb. respectively. The administration of the premix caused an increase in butterfat production by 20% at the end of the first month and by 10.6% at the end of the second month.

For a better comparison between the control and premix data, the data obtained from the cows was classified according to their stage of lactation. In order to eliminate the influence of normal physiological peak in early lactation, the milk production levels and butterfat percentages of animals that had passed peak lactation were taken into consideration for the interpretation of the results. Thus, it was observed from the study that the animals which had passed peak lactation as well as those in late lactation responded favourably to the administration of the premix. Considering the above groups of animals as a single group, the initial average daily milk production before feeding the premix was 21.5 lbs. while the average milk production at the end of the first and second month after feeding the premix were 29.0 lbs. and 30.6 lbs. respectively. The average butterfat percentages for the corresponding periods were 4.6%, 3.99% and 3.65% respectively. Thus, the administration of the premix resulted in an increase of milk production by 34.9% and 42.3% at the end of the first and second month respectively as compared to the control without the feeding of the premix.

EXAMPLE 2

A premix was prepared containing the ingredients and having the analysis as set out in Table 3 below:

TABLE 3

| FORMULA INGREDIENT | % | GUARANTEED ANALYSIS | % |
|---|---|---|---|
| Dicalcium Phosphate | 20.5 | Crude Protein | 25.0 |
| Feed Grade Potassium | | Crude Fat | 0.70 |
| & Magnesium Sulfate | 5.0 | Crude Fiber (Max.) | 1.50 |
| Salt | 5.0 | Calcium | 5.00 |
| Sodium Bicarbonate | 4.0 | Phosphorous | 5.00 |
| Zinc Oxide | 0.343 | Magnesium | 0.70 |
| Manganous Oxide | 0.135 | Potassium | 1.20 |
| Copper Sulfate | 0.10 | Salt | 5.00 |
| Ferrous Sulfate | 0.12 | Iron | 0.23 |
| Cobalt Carbonate | 0.00625 | Zinc | 0.25 |
| Ethylenediamine Dihydroiodide | 0.0075 | Manganese | 0.081 |
| Vitamin A (500,000 Iu/gm) | 0.021 | Copper | 0.025 |
| | | Cobalt | 0.0025 |
| | | Iodine | 0.006 |
| Vitamin D3 (400,000 Iu/gm) | 0.00965 | Fluorine (Max.) | 0.05 |
| Vitamin E (500 Iu/gm) | 0.021 | Vitamin A I.u/lb | 47,500 |
| | | Vitamin D I.u/lb | 17,500 |
| Methionine Hydroxy Analog of Calcium | 11.00 | Vitamin E I.u/lb | 47.5 |
| Aspergillus oryzae (Zymaferm) | 1.0 | | |
| Soybean Meal (44%) | 6.00 | | |
| Corn Gluten Meal (60%) | 35.00 | | |
| Linseed Meal (33%) | 5.00 | | |
| Liquid Molasses | 5.00 | | |
| Felcofix Molasses Flavor | 2.00 | | |
| Total | 100.26 | | |

A feeding experiment was conducted over a period of three weeks on Holstein cows. The animals were maintained on a normal feeding programme consisting of an intake of 40 and 42 lbs. succulent forages, 4 lbs. dry roughage and 13 lbs. concentrates per cow per day. The concentrate was the same as that described in Example 1.

As a control, the initial levels of milk production and butterfat percentages were recorded for individual cows before the feeding of the premix. At the time of recording initial levels there were 123 cows in the herd, out of which only 78 cows (63.4%) had data on their milk production and butterfat percentages. Among these 53.8% were passed peak lactation, 12.8% were under early lactation, 26.9% were bred and 6.4% were first calf heifers at first lactation.

These cows were then fed their normal feeding programme to which was added 8 ounces of the premix as a top feed for a period of three weeks. The data on milk production and butterfat percentage of individual cows was recorded at the end of the three weeks of feeding the premix. At this time there were 129 cows in the herd out of which only 95 cows (73.6%) had data on their milk production and butterfat percentage. Among these 66.3% were passed peak lactation, 13.7% had calved and were under early lactation, 10.5% were bred and 9.5% were first calf heifers under first lactation. For a better comparison between the control and final observations, the animals were classified according to their stage of lactation and physiological condition, e.g. pregnancy.

The average daily milk production of cows passed peak lactation prior to feeding the premix and after feeding for three weeks were 38.7 lbs. and 39.4 lbs. respectively while the average daily butterfat percentage for the corresponding periods were 3.316% and 3.762% respectively. Thus, the feeding of the premix resulted in a 18.1% increase in milk production and a 13.44% increase in butterfat percentage.

The average daily milk production of cows in early lactation for the control and final periods were 52.0 lbs. and 59.6 lbs. respectively while the average daily butterfat percentages were 3.3% and 3.634% respectively. This means a 14.6% increase in milk production and a 10.1% increase in butterfat percentage.

The average daily milk production of bred cows for the control and final periods were 44.7 lbs. and 46.5 lbs. respectively, while the average daily butterfat percentage for the corresponding periods were 3.1% and 3.36% respectively. Thus, the feeding of the premix resulted in a 4.03% increase in milk production and an 8.4% increase in butterfat percentage.

The above results clearly show that the premix of the present invention caused a significant increase in milk production and butterfat percentage of cows in early lactation. It should also be noted that the control animals without the premix as a part of their feed reached their average peak production of 52 lbs. per day on an average of 25 days after calving whereas the animals being fed the premix attained an average peak production of 59.6 lbs. in an average of 21 days after calving. In other words, the premix of the invention resulted in a higher peak production in a shorter period of time after calving.

The studies described in the literature on the effects of feeding methionine hydroxy analog as a part of a feed concentrate presented their results on the basis of a balanced animal feed including such materials as corn, soybean meal, molasses, wheat, distillers grains, dicalcium phosphate, salt, trace minerals, Vitamins A and D, etc. Thus, it is evident that it is not the presence of such materials in the premix of the present invention which so markedly enhances the effectiveness of the methionine hydroxy analog. They represent nothing more than the usual essential nutrients. The additional components not to be found in the concentrates described in the literature are the fungal enzyme and the buffer. As has been explained above, it is believed that these serve to adjust the conditions within the complex digestive tract of the cow so that a maximum amount of the analog will escape ruminal degradation and be available for amination in the liver to form the amino acid methionine.

EXAMPLE 3

A dairy feed additive concentrate was prepared containing the ingredients and having the analysis as set out in Table 4 below:

TABLE 4

| FORMULA INGREDIENT | % | GUARANTEED ANALYSIS | % |
|---|---|---|---|
| Methionine Hydroxy Analogue of Calcium | 40.00 | Crude Protein (Min.) | 1.8 |
| Dried Fermentation Extract of A. Oryzae & Bacillus Subtilis or A. Oryzae | 15.00 | Crude Fat (Min.) | 0.3 |
| Sodium Bicarbonate | 33.00 | Crude Fibre (Max.) | 1.65 |
| Ferrous Sulfate | 6.50 | Calcium | 4.50 |
| Zinc Oxide | 1.75 | Phosphorus | 0.15 |
| Manganous Oxide | 0.675 | Iron | 1.36 |
| Copper Sulfate | 0.500 | Copper | 0.125 |
| Cobalt Carbonate | 0.03125 | Manganese | 0.405 |
| EDDI | 0.0375 | Cobalt | 0.0125 |
| Vitamine A (500,000 Iu/gm) | 0.35 | Zinc | 1.25 |
| Vitamine $D_3$ (400,000 Iu/gm) | 0.15 | Iodine | 0.03 |
| Vitamin E 50% (500 Iu/gm) | 0.385 | Methionine Hydroxy Analog of Calcium | 40.00 |
| Maple Flavor | 2.00 | | |
| Total | 100.38 | Vitamin A I.u/Kg. | 1,425,000 |
| | | Vitamin $D_3$ I.u/Kg. | 470,000 |
| | | Vitamin E I.u/Kg. | 1,925 |

The above concentrate is mixed in an amount of 10 kg. with cereals, proteins and sources of calcium and phosphate to make a tonne of complete 16% dairy feed.

The 16% dairy ration formula is given in Table 5 below.

TABLE 5

| INGREDIENTS | QUANTITY |
|---|---|
| Corn | 445.50 |
| Oats | 215.50 |
| Wheat Bran | 115.50 |
| Soyabean Meal (44%) | 175.00 |
| Concentrate of Table 4 | 10.00 |
| Calcium Carbonate | 10.00 |
| Dicalcium Phosphate | 8.50 |
| Liquid Molasses | 10.00 |
| | 1,000.00 |

EXAMPLE 4

A premix was prepared containing the ingredients and having the analysis as set out in Table 6 below:

TABLE 6

| FORMULA INGREDIENT | % | GUARANTEED ANALYSIS | % |
|---|---|---|---|
| Soybean Meal (48% CP) | 32.00 | Crude Protein (Min.) | 15.00 |
| Dicalcium Phosphate | 17.50 | Crude Fat (Min.) | 0.16 |
| Sodium Tripolyphosphate | 17.00 | Crude Fiber (Max.) | 1.25 |
| Potassium and Mangesium Sulfate | 5.00 | 4.00 | |
| Sodium Bicarbonate | 5.00 | Phosphorus | 8.00 |
| Salt | 5.00 | Magnesium | 0.70 |
| Zinc Oxide | 0.35 | Potassium | 1.20 |
| Manganous Oxide | 0.12 | Iron | 0.18 |
| Copper Sulfate | 0.10 | Zinc | 0.25 |
| Cobalt Carbonate | 0.00625 | Manganese | 0.081 |
| EDDI (Ethylene Diaminedihydroiodide) | 0.0075 | Copper | 0.025 |
| Vitamin A 500 (500,000 Iu/gm) | 0.063 | Cobalt | 0.0025 |
| Vitamin $D_3$ (400,000 Iu/gm) | 0.026 | Iodine | 0.006 |
| Vitamine E 50% (500 Iu/gm) | 0.08 | Flourine(Max.) | 0.05 |
| Methionine Hydroxy Analogue of Calcium | 11.00 | Salt | 5.00 |

TABLE 6-continued

| FORMULA INGREDIENT | % | GUARANTEED ANALYSIS | % |
|---|---|---|---|
| Dried Fermentation Extract of *A. Oryzae* | 2.00 | Vitamin A I.u/Kg. | 285,000 |
| & Bascillus Subtilis or *A. Oryzae* | | Vitamin D₃ I.u/Kg. | 94,000 |
| Liquid Molasses | 4.00 | Vitamine E I.u/Kg. | 385 |
| Artificial Flavor (Maple) | 1.00 | | |
| Total | 100.25 | | |

EXAMPLE 5

A premix was prepared containing the ingredients and having the analysis as set out in Table 7 below:

TABLE 7

| FORMULA INGREDIENT | % | GUARANTEED ANALYSIS | % |
|---|---|---|---|
| Soybean Meal 48% | 42.50 | Crude Protein (Min.) | 20.00 |
| Dicalcium Phosphate | 24.00 | Crude Fat (Min.) | 0.21 |
| Potassium and Magnesium Sulfate | 5.00 | Crude Fiber (Max.) | 1.50 |
| Salt | 5.00 | Calcium | 5.00 |
| Sodium Bicarbonate | 5.00 | Phosphorus | 5.00 |
| Methionine Hydroxyanalog of Calcium | 11.00 | Magnesium | 0.75 |
| | | Potassium | 1.20 |
| Dried Fermentation Extract of A. Oryzae & Bascillus Subtillis or A. Oryzae | 2.00 | Iron | 0.24 |
| | | Zinc | 0.25 |
| | | Manganese | 0.081 |
| Zinc Oxide | 0.35 | Copper | 0.025 |
| Manganous Oxide | 0.1215 | Cobalt | 0.0025 |
| Copper Sulfate | 0.10 | Fluorine (Max.) | 0.05 |
| Cobalt Carbonate | 0.00625 | Salt | 5.00 |
| EDDI (Ethylene Diamine Dihydroiodide) | 0.0075 | Vitamin A I.u./Kg | 104,500 |
| Vitamin A 500 (500,000 Iu/gm) | 0.023 | Vitamin D₃ I.u./Kg | 38,500 |
| Vitamin D₃ (400,000 Iu/gm) | 0.011 | Vitamin E I.u./Kg. | 104.5 |
| Vitamin E 50% (500 Iu/gm) | 0.21 | | |
| Liquid Molasses | 4.00 | | |
| Artificial Flavor (Maple) | 1.00 | | |

EXAMPLE 6

A premix was prepared containing the ingredients and having the analysis as set out in Table 8 below:

TABLE 8

| FORMULA INGREDIENT | % | GUARANTEED ANALYSIS | % |
|---|---|---|---|
| Soybean Meal 48% | 34.00 | Crude Protein (Min.) | 16.00 |
| Dicalcium Phosphate | 34.00 | Crude Fat (Min.) | 0.17 |
| Potassium and Magnesium Sulfate | 5.00 | Crude Fiber (Max.) | 1.25 |
| Salt | 5.00 | Calcium | 7.00 |
| Sodium Bicarbonate | 5.00 | Phosphorus | 7.00 |
| Methionine Hydroxy Analog of Calcium | 11.00 | Magnesium | 0.70 |
| Dried Fermentation Extract of A. Oryzae & Bascillus Subtilis or A. Oryzae | 2.00 | Potassium | 1.20 |
| | | Iron | 0.34 |
| Zinc Oxide | 0.35 | Zinc | 0.25 |
| Manganous Oxide | 0.12 | Manganese | 0.081 |
| Copper Sulfate | 0.10 | Copper | 0.025 |
| Cobalt Carbonate | 0.00625 | Cobalt | 0.0025 |
| EDDI (Ethylene Diamine Dihydroiodide) | 0.0075 | Iodine | 0.006 |
| Vitamin A 500 (500,000 I.u./gm) | 0.063 | Fluorine (Max.) | 0.06 |
| Vitamin D₃ (400,000 I.u./gm) | 0.026 | Salt | 5.00 |
| | | Vitamin A I.u./gm | 285,000 |
| Vitamin E 50% (500 I.u./gm) | 0.08 | Vitamin D₃ I.u./Kg. | 94,000 |
| Liquid Molasses | 3.00 | | |
| Artificial Flavor (Maple) | 1.00 | Vitamin E I.u./Kg. | 385 |

I claim:

1. A method of improving the milk production of dairy cows, which comprises feeding to said cows as part of their feed diet a composition or complex of 2-hydroxy-4-(methylthio) butyric acid methionine hydroxy analog and a fungal enzyme derived from a microorganism of the genus *Aspergillus,* the methionine hydroxy analog being present in an amount of 5-20% by weight of the composition and being in particulate form, with the particles thereof being coated with a powder of synthetic flavoring agent which masks the taste of the methionine and fungal enzyme being present in an amount of 0.5-5% by weight of the composition and a buffer in the amount of 2-6% by weight, the composition or complex being fed in an amount to provide 20-40 g./day of the methionine hydroxy analog to each cow.

2. The method according to claim 1 wherein the methionine hydroxy analog is provided in an amount of 20-30 g./day.

3. The method according to claim 1 wherein the additive is fed as a top dressing on a dairy feed mash.

4. An animal feed additive comprising a composition or complex of (a) about 5-20% by weight of (methylthio) butyric acid methionine hydroxy analog in particulate form, with the particles thereof being coated with a powder of synthetic flavoring agent which masks the taste of the methionine, (b) 0.5-5% by weight of a fungal enzyme derived from a microorganism of the genus *Aspergillus* and (c) a buffer in the amount of 2–6% by weight.

5. A feed additive according to claim 4 which includes essential nutrients.

6. A feed additive according to claim 5 wherein the essential nutrients include major and trace minerals, salt, vitamins and protein sources.

7. A feed additive according to claim 6 wherein the enzyme is derived from *Aspergillus oryzae*.

8. A feed additive according to claim 6 wherein the buffer is selected from sodium, potassium and calcium bicarbonate or mixtures thereof with magnesium oxide.

9. A feed additive according to claim 6 blended with a dairy feed mash.

* * * * *